April 26, 1960
R. D. WARREN
2,934,371
LIVESTOCK TRAILER
Filed Aug. 16, 1957
3 Sheets-Sheet 1
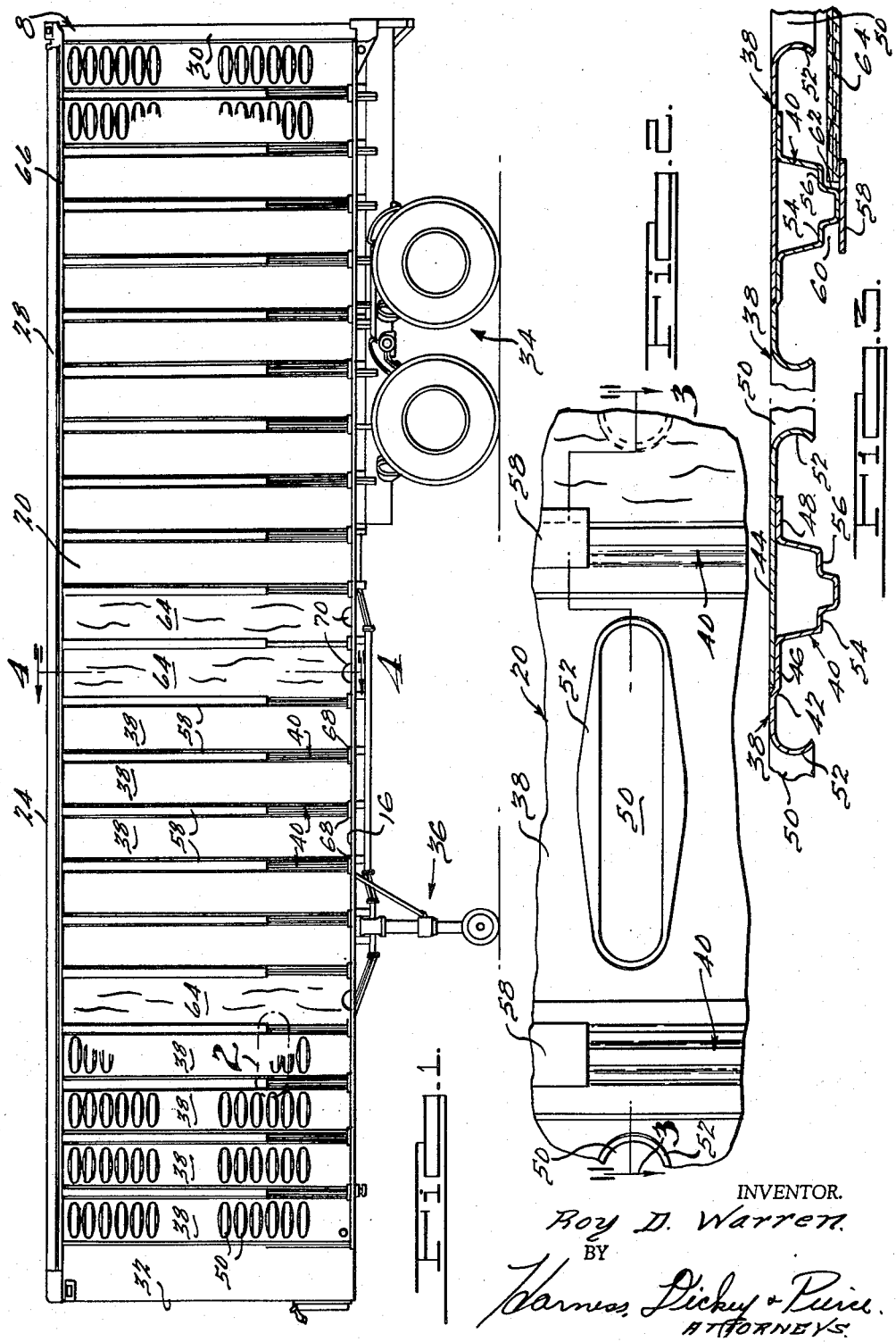
INVENTOR.
Roy D. Warren
BY
Harness, Dickey & Pierce
ATTORNEYS.

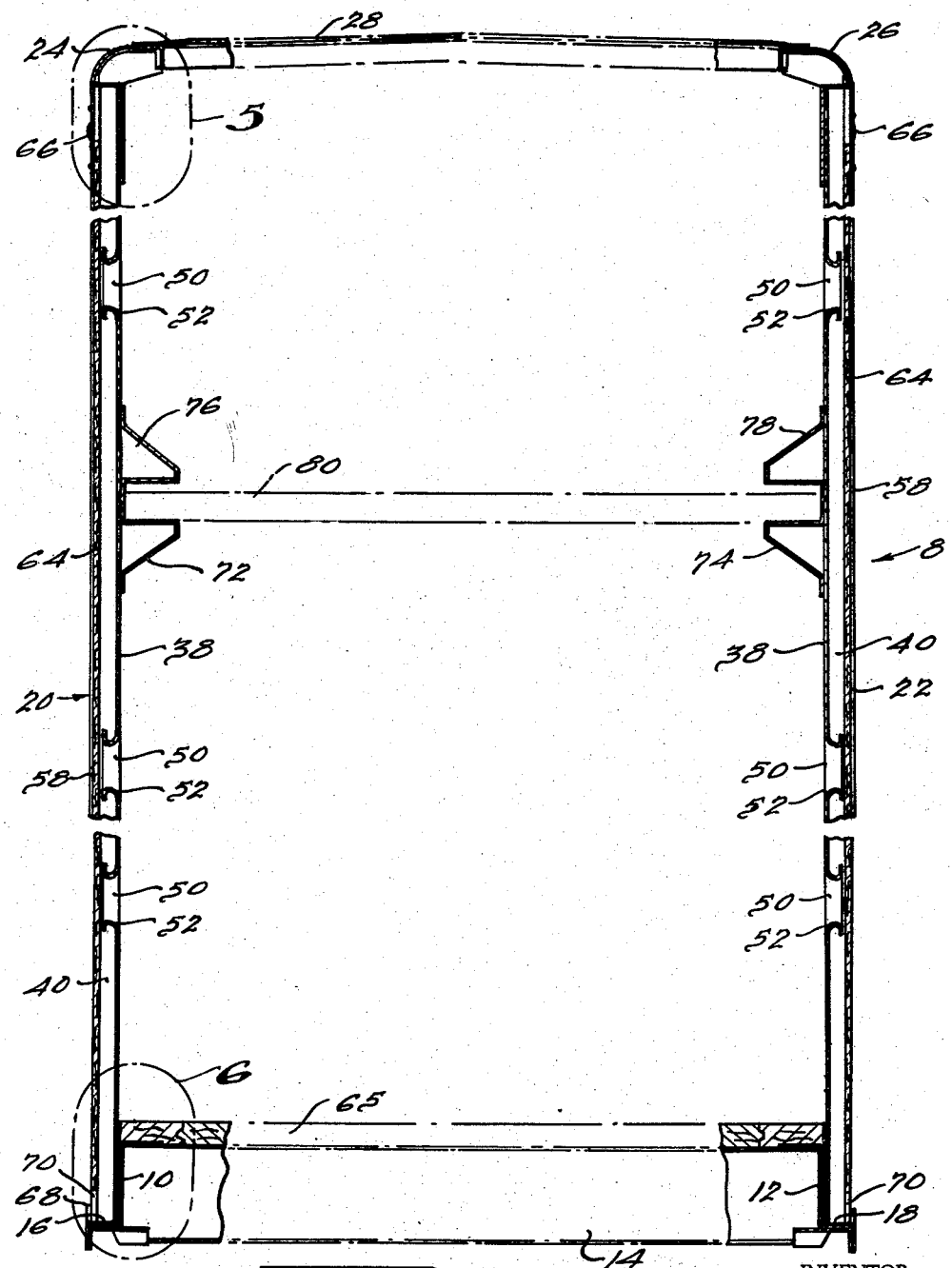

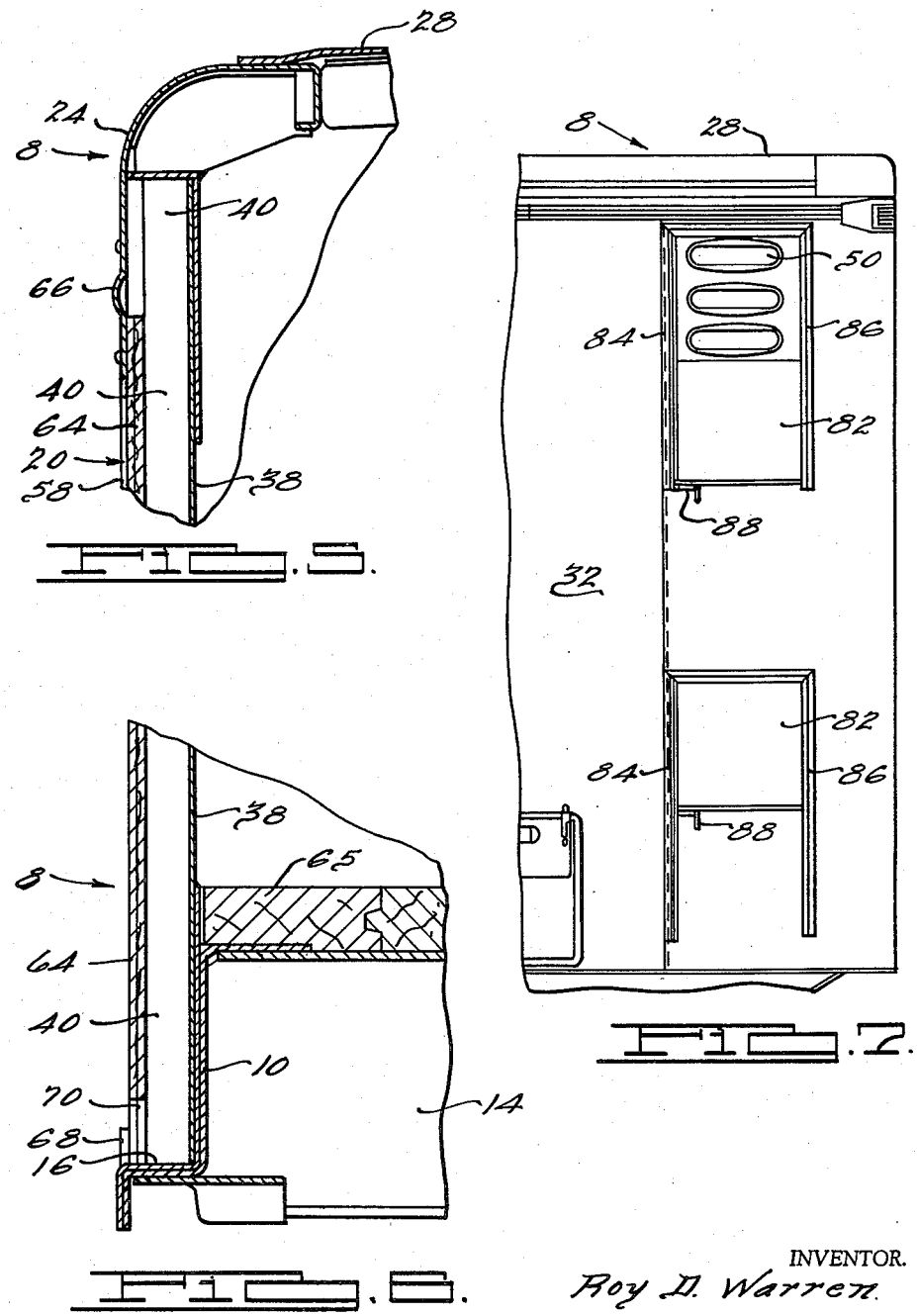

United States Patent Office 2,934,371
Patented Apr. 26, 1960

2,934,371
LIVESTOCK TRAILER
Roy D. Warren, St. Clair Shores, Mich., assignor to Fruehauf Trailer Company, Detroit, Mich., a corporation of Michigan Application August 16, 1957, Serial No. 678,648
7 Claims. (Cl. 296—28)

This invention relates to new and useful improvements in trailer constructions and more particularly to an improved body construction for a livestock trailer.

Heretofore, the bodies of livestock trailers have generally been made with side walls having a tubular truss-type supporting framework closed in by spaced parallel horizontal slats fastened thereto. These trailers usually have a removable floor at substantially the middle thereof to provide separate upper and lower decks for carrying animals such as hogs or the like. When the upper deck of the trailer is loaded considerable weight is concentrated at the top of the body. As a result, an exceedingly sturdy and rigid construction is necessary to prevent sway or flexure of the body under service conditions.

The truss-type framework heretofore used provides the necessary strength and rigidity but it has the disadvantage of being difficult and expensive to build. In this type of construction the ends of the frame members have to be mitered and the members themselves individually fitted and welded in place. Manifestly, in such a construction the labor is great and the cost high.

In addition to the above the conventional truss-type construction has the disadvantage that it is difficult to clean. Dirt accumulates in the joints and corners between the frame members and between the slats and the framework and in many instances the places where dirt accumulates are not readily accessible for cleaning. Further, animals in the trailer sometimes are caught between the slats and injured.

An important object of the present invention is to provide an improved body construction for livestock trailers that eliminates the deficiences of the prior construction hereinabove referred to.

Another object of the invention is to provide an improved body construction for livestock trailers that can be manufactured more easily and less expensively than heretofore without sacrificing necessary strength and rigidity.

Still another object of the invention is to provide a novel body construction for livestock trailers that provides a neater and more pleasing appearance.

Yet another object of the invention is to provide a novel body construction for livestock trailers that permits the body to be cleaned more easily than heretofore.

Other objects and advantages of the invention will be apparent during the course of the following description.

In the drawing forming a part of this specification and wherein like numerals are employed to designate like parts throughout the same:

Figure 1 is a side elevational view of a livestock trailer embodying the invention, Figure 2 is an enlarged view of the portion of Fig. 1 enclosed in the circle 2, Fig. 3 is a longitudinal sectional view taken on the line 3—3 of Fig. 2, Fig. 4 is an enlarged, vertical sectional view taken on the line 4—4 of Fig. 1, Fig. 5 is an enlarged view of the portion of Fig. 4 enclosed in the circle 5, Fig. 6 is an enlarged view of the portion of Fig. 4 enclosed in the circle 6, and Fig. 7 is a fragmentary front elevational view of the trailer body.

The trailer body 8 of this invention has a base frame comprising a pair of longitudinal side members 10 and 12 which extend the full length of the body and are connected by a plurality of longitudinally spaced cross bolsters 14. The side rails 10 and 12 are recessed, as perhaps best shown in Fig. 4, to provide horizontal supporting ledges 16 and 18 which carry side wall assemblies 20 and 22. Upper cap rails 24 and 26 surmount the wall assemblies 20 and 22 and support a conventional roof assembly 28. Vertical corner posts 30 are provided at the rear of side walls 20 and 22 for mounting doors or other suitable rear end closures (not shown) which conveniently can be of conventional design and construction. A front wall 32 connects the side wall assemblies 20 and 22 at the forward end of the body. All of the above parts and assemblies are integrally joined in any suitable manner as by welding.

The trailer body 8 is here shown supported at the rear by a conventional tandem wheel assembly 34 and at the forward end thereof by a conventional landing gear unit 36. Both the wheel assembly 34 and the landing gear unit 36 are connected to the base frame of the trailer body according to conventional practice.

As suggested, the primary novelty of this invention is in the unique structure of the side wall assemblies 20 and 22 and in the manner in which these wall assemblies are incorporated in the trailer body to produce a finished structure having the required strength and rigidity. More particularly, each side wall assembly comprises a plurality of identical wall panels 38 arranged side by side in overlapping relation, as perhaps best shown in Figs. 1 and 3. In this connection it will be observed that each wall panel 38 is formed adjacent one edge thereof with an outwardly presented vertical corrugation 40. At the inner side of the corrugation 40 the panel 38 is outwardly offset, as at 42, and the offset portion including the corrugation 40 overlaps the marginal portion 44 of the adjacent wall panel. As shown in Fig. 3, the offset 42 is such that the underlying marginal portion 44 extends flush with the inner surface of the panel 38 to provide an essentially smooth flat inner wall surface. The flanges 46 and 48 at opposite sides of the corrugation 40 are spot welded or otherwise fastened to the underlying marginal portion 44 to integrally join the panels in a unitary wall structure.

By reason of the above construction the side walls 20 and 22 can be made as subassemblies and then assembled as unitary structures in the trailer body. The individual wall panels 38 can all be made by conventional stamping and forming operations and they can be welded together by automatic welding equipment of conventional design. In this manner, the side wall assemblies can be made much faster and less expensively than heretofore.

Each wall panel 38 also is formed with a plurality of vertically spaced, horizontally elongated, flanged openings 50 which serve a double purpose of providing ventilation for the trailer body and of cooperating with the corrugations 40 to provide necessary strength and rigidity. If the trailer body is to be divided into upper and lower decks the openings 50 preferably are divided in two groups, as shown in Fig. 1, to assure adequate ventilation for each deck. The upper deck floor is then attached to the imperforate wall sections of the side wall assemblies between the two sets of openings.

Of particular significance is the fact that each opening 50 is formed with an outwardly rolled flange 52 which extends continuously therearound. The flange 52 is rolled outwardly on a relatively large radius as shown in Fig. 3 so that the flange joins the panels smoothly and without sharp corners or edges capable of injuring stock in the trailer or providing crevices or recesses in which dirt accumulates. At least the inner portions of the flanges 52 extend outwardly at substantially right angles to the plane of the panel 38, and the outer portions thereof are rolled back so as to extend radially outwardly from the openings parallel to and spaced outwardly from the panel. In this connection it will be observed that the outwardly rolled portions of the flanges 52 are essentially abbreviated at the ends of the openings 50 but they increase gradually in width toward the middle of the openings. Thus, the outer portions of the flanges 52 are of maximum width at the middle of the openings, and they taper from the middle toward the ends of the openings.

The wide outer flanges at the middle of the openings 50 contribute very substantially to the rigidity of the wall. However, the particular flanged shape of the openings 50 will not of themselves provide the required strength and rigidity. By the same token the corrugations 40 alone will not make the trailer body sufficiently rigid to stand up under service conditions. However, the particular flanged openings 50 when present in combination with the corrugations 40 provide a wall structure which is pre-eminently satisfactory in this regard.

Rabbets 54 and 56 are provided at opposite sides of the corrugations 40 and metal strips 58 are welded or otherwise fastened on the crowns of the corrugations. The strips 58 overlap the rabbets 54 and 56 to define opposed grooves 60 and 62 at opposite sides of the panels and forwardly of the flanges 52. Removable panels 64 of plywood or the like are provided in overlying relation to the wall panels 38 with the marginal edges thereof slidably received in the grooves 60 and 62.

As shown in Fig. 1, the strips 58 extend to the tops of the side walls 20 and 22 but they terminate a substantial distance from the bottom thereof so that the panels 64 can be easily inserted into the grooves 60 and 62 from the bottom thereof. When the panels 64 are fully inserted, the top portions thereof underlay the lower portions 66 of cap rails 24 and 26. As shown in Fig. 5, the lower portions 66 extend downwardly over the corrugations 40. The manner in which the lower portions 66 overlap the panels 64 assures a relatively weathertight construction.

The bottoms of the panels 64 are confined by retaining tabs 68 also fastened to the crowns of the corrugations 40 at the bottoms thereof. Recesses 70 in the lower edges of the panels 64 provide convenient hand holds for use in inserting or removing the panels. In this connection, it will be observed (Fig. 5) that the panels 64 can be pushed upwardly for a limited distance behind the cap rails 24 and 26 and disengaged from the retaining tabs 68. When thus disengaged, the panels 64 can be pulled outwardly and dropped out of the channels 60 and 62. Conversely, the panels can be placed on the body by inserting them upwardly into the channels 60 and 62 to a position above the retaining tabs 68 and then dropping them into position behind the tabs.

The removable panels 64 are used to cut down ventilation of the trailer body when the latter is used for the primary purpose of hauling stock. In bad weather or when the weather is cold it is desirable to close off all or part of the ventilating openings 50 and this can be done easily and quickly by means of the panels 64. By controlling the number of panels used and judiciously arranging them on the trailer substantially any desired amount of ventilation can be obtained. In addition, the panels 64 permit the trailer to be converted easily and quickly to a dry freight van.

As shown in Fig. 4, flooring 65 for the lower deck of the trailer is laid longitudinally of the trailer on the cross bolsters 14. On the other hand, flooring 80 for the upper deck is laid crosswise of the trailer body supported by deck rails 72 and 74 on the side walls 20 and 22. The deck rails 72 and 74 can be positioned at any desired height in the trailer body 8 but they are usually positioned at about the middle of the trailer, as shown in Fig. 4. As suggested, the vertical series of openings 50 in the side wall panels 38 usually are interrupted in the area where the deck rails are mounted. Upper deck rails 76 and 78 on the side wall assemblies 20 and 22 hold the upper deck flooring 80 in place.

The upper decking is removable so that the trailer can be used to haul large animals such as cows or horses. Also, it usually is desirable to remove the upper decking 80 when the trailer is converted to a dry freight van. To this end, the upper deck rails 76 and 78 terminate short of one end of the trailer body so that the individual boards of the decking can be maneuvered into and out of the space between the upper and lower deck rails. The last few boards are left loose or alternatively removable retainers can be provided to hold them in place. The flooring 80 is removed in a reverse manner.

The front of the trailer preferably is provided with one or more sets of ventilating openings 50 for each of the upper and lower decks thereof, and each set of ventilating openings can be closed by a sliding panel 82 slidably mounted between spaced vertical guides 84 and 86. The panels 82 are held in either raised or lowered position by suitable latches 88. As shown at the top in Fig. 7, the panels 82 are lowered to open the ventilating openings 50, and as shown at the bottom of Fig. 7 the panels are raised to close the openings.

It may thus be seen that I have achieved the objects of my invention. I have provided a livestock trailer that can be fabricated more easily and more quickly than heretofore and consequently is less expensive to manufacture. Furthermore, this is done without sacrificing necessary strength and rigidity of the trailer body. The finished trailer is neat and attractive in appearance, and the construction is such that the trailer can be kept clean and sanitary at all times.

Having thus described the invention, I claim:

1. In a livestock trailer, a body having a frameless side wall formed from a plurality of interconnected metal panels disposed side by side, said panels having vertical corrugations adjacent the edges thereof and middle portions provided with vertically spaced ventilating openings, said openings having flanges extending continuously therearound and said flanges having inner flange portions directed outwardly from said panels and outer flange portions extending outwardly from said openings and at least portions of said outer flange portions being of substantial width, said corrugations and said flanges mutually cooperating to impart essential stiffness and rigidity to the wall without necessity of auxiliary reinforcing framing.

2. In a livestock trailer, a body having a frameless side wall formed from a plurality of interconnected metal panels disposed side by side, said panels having vertical corrugations adjacent the edges thereof and middle portions provided with vertically spaced elongated ventilating openings, said openings having flanges extending continuously therearound and said flanges having inner portions directed outwardly from and generally at right angles to said panels and outer portions extending radially outwardly from said openings substantially parallel to and spaced from the main body of the panel, said outer flange portions at opposite sides of said openings increasing in width from the ends of said openings, said corrugations and said flanges mutually cooperating to impart essential stiffness and rigidity to the wall without necessity of auxiliary reinforcing framing.

3. In a livestock trailer, a body having a frameless side wall formed from a plurality of interconnected metal panels disposed side by side, said panels having vertical corrugations adjacent the edges thereof and middle portions provided with vertically spaced ventilating openings, said openings having inner flange portions rolled outwardly generally at right angles to the panel and outer flange portions rolled radially outwardly from the openings and at least portions of said outer flange portions being of substantial width, the rolled portions of said flanges being smooth and continuous so as not to injure stock carried by the trailer, said corrugations and the flanges around said openings mutually cooperating to impart essential stiffness and rigidity to the wall without necessity of auxiliary reinforcing framing.

4. In a livestock trailer, a body having a frameless side wall formed from a plurality of interconnected metal panels disposed side by side, said panels having vertical corrugations adjacent the edges thereof and middle portions provided with vertically spaced ventilating openings, said openings being elongated and having flanges extending continuously therearound, said flanges having inner portions rolled outwardly from and generally at right angles to said panels and outer portions extending radially outwardly from said openings, the portions of said flanges extending lengthwise of the openings being of maximum width at substantially the middle of said openings and tapering toward the ends of the openings, said corrugations and said flanges mutually cooperating to impart essential stiffness and rigidity to the wall without necessity of auxiliary reinforcing framing.

5. In a livestock trailer, a body having a frameless side wall formed from a plurality of interconnected metal wall panels disposed side by side, said wall panels having vertical corrugations adjacent the edges thereof and middle portions provided with vertically spaced flanged ventilating openings, said corrugations having vertical rabbets at opposite sides thereof, strips mounted on and fastened to said corrugations overlapping said rabbets and defining opposed grooves at opposite sides of said wall panels, and removable cover panels overlaying said wall panels with the edge portions thereof in and confined by said grooves, said corrugations and the flanges around said openings mutually cooperating to impart essential stiffness and rigidity to the wall without necessity of auxiliary reinforcing framing.

6. In a livestock trailer, a body having frameless side walls formed from a plurality of interconnected metal wall panels disposed side by side, said wall panels having vertical corrugations adjacent the edges thereof and middle portions provided with vertically spaced flanged ventilating openings, said corrugations and the flanges around said openings mutually cooperating to impart essential stiffness and rigidity to the wall without necessity of auxiliary reinforcing framing, means forming opposed channels at opposite sides of and forwardly of each wall panel, removable cover panels overlaying said wall panels with the edge portions thereof in and confined by said grooves, means normally retaining said cover panels in said grooves, and means permitting removal of said cover panels from said grooves.

7. In a livestock trailer, a body having a frameless wall formed from a plurality of interconnected metal wall panels disposed side by side, said wall panels having vertical corrugations adjacent the edges thereof and middle portions provided with vertically spaced ventilating openings, said ventilating openings being horizontally elongated and having flanges extending outwardly from said panels and generally at right angles thereto and thence outwardly away from said openings and in generally spaced parallel relation to said panels, the last mentioned portions of said flanges being of maximum width at the middle of said openings and tapering toward the ends of said openings but extending continuously in unbroken continuity around said openings, said corrugations and said flanges mutually cooperating to provide essential stiffness and rigidity to the wall without necessity of auxiliary reinforcing framing, means providing opposed channels in said corrugations at opposite sides of said panels and forwardly of said flanges, and removable cover panels in overlying relation to said wall panels having the marginal edge portions thereof slidably received in said channels.

References Cited in the file of this patent

UNITED STATES PATENTS

| | | |
|---|---|---|
| 1,170,927 | Moore | Feb. 8, 1916 |
| 1,582,176 | Haggart | Apr. 27, 1926 |
| 2,164,646 | Edahl | July 4, 1939 |
| 2,384,965 | Reid | Sept. 18, 1945 |